(12) United States Patent
Ryu et al.

(10) Patent No.: US 9,387,836 B2
(45) Date of Patent: Jul. 12, 2016

(54) VARIABLE PEDAL FEELING ADJUSTMENT DEVICE (71) Applicant: MANDO CORPORATION, Pyeongtaek-si, Gyeonggi-do (KR)

(72) Inventors: Dong Yo Ryu, Seongnam-si (KR); Jong-Gu Son, Seoul (KR)

(73) Assignee: MANDO CORPORATION, Pyeongtaek-Si, Gyeonggi-Do (KR)

(\*) Notice: Subject to any disclaimer, the term of this patent is extended or adjusted under 35 U.S.C. 154(b) by 0 days.

(21) Appl. No.: 14/300,838

(22) Filed: Jun. 10, 2014

(65) Prior Publication Data

US 2014/0361473 A1 Dec. 11, 2014

(30) Foreign Application Priority Data

Jun. 10, 2013 (KR) .................. 10-2013-0065587

(51) Int. Cl.
*B60T 8/42* (2006.01)
*B60T 7/06* (2006.01)
*B60T 7/04* (2006.01)
*B60T 8/40* (2006.01)
*B60T 11/18* (2006.01)
(Continued)

(52) U.S. Cl.
CPC . *B60T 7/06* (2013.01); *B60T 7/042* (2013.01); *B60T 8/409* (2013.01); *B60T 11/18* (2013.01); *G05G 1/30* (2013.01); *G05G 5/03* (2013.01)

(58) Field of Classification Search
CPC .......... B60T 17/00; B60T 7/06; B60T 11/18; B60T 7/042; B60T 8/409; G05G 5/03; G05G 1/30

USPC ............ 303/115.1, 113.4; 267/140.2; 60/553, 60/556, 568
See application file for complete search history.

(56) References Cited

U.S. PATENT DOCUMENTS 6,139,119 A \* 10/2000 Otomo ........................ 303/113.1
6,672,685 B2 \* 1/2004 Ishimura et al. ........... 303/113.4
(Continued)

FOREIGN PATENT DOCUMENTS

DE 60315451 T2 4/2008
JP 2002308084 A \* 10/2002
(Continued)

OTHER PUBLICATIONS

Office Action German Patent Application No. 102014008787.5 dated Mar. 23, 2015 with full English translation.

*Primary Examiner* — Thomas J Williams
*Assistant Examiner* — Mariano Sy
(74) *Attorney, Agent, or Firm* — McDermott Will & Emery LLP (57) ABSTRACT

Disclosed herein is a variable pedal feeling adjustment device. A pedal simulator includes a simulator block formed with an oil hole at an upper portion thereof which is connected to a master cylinder to receive hydraulic pressure caused by pedal effort of a driver and a bore which communicates with the oil hole, a first reaction unit and a second reaction unit arranged in series in the bore and configured to be pressurized sequentially by pedal effort, and a damping housing configured to support the second reaction unit and installed to a lower portion of the bore while being restricted in rotation. An actuator includes a spindle screw-coupled to the damping housing and a motor connected to the spindle to supply rotational force to the spindle. The damping housing is moved linearly and changed in position by forward and backward rotation of the spindle.

12 Claims, 6 Drawing Sheets

(51) Int. Cl.
  *G05G 5/03* (2008.04)
  *G05G 1/30* (2008.04)

(56) References Cited

U.S. PATENT DOCUMENTS

| | | | |
|---|---|---|---|
| 7,003,954 B2 * | 2/2006 | Ogiwara et al. | 60/568 |
| 7,322,657 B2 * | 1/2008 | Matsuhashi | 303/113.4 |
| 8,757,734 B2 * | 6/2014 | Toyohira et al. | 303/113.4 |
| 2004/0181381 A1 | 9/2004 | Matsuhashi | |
| 2014/0069093 A1 * | 3/2014 | Kim | 60/553 |
| 2014/0138888 A1 * | 5/2014 | Kim | 267/140.13 |
| 2014/0230429 A1 * | 8/2014 | Kim et al. | 60/553 |
| 2014/0360177 A1 * | 12/2014 | Ryu et al. | 60/556 |
| 2015/0101447 A1 * | 4/2015 | Kim | 74/512 |

FOREIGN PATENT DOCUMENTS

| | | |
|---|---|---|
| JP | 2004243983 A * | 9/2004 |
| JP | 2007030756 A * | 2/2007 |
| KR | 2004-0049405 A | 6/2004 |

* cited by examiner

VARIABLE PEDAL FEELING ADJUSTMENT DEVICE

CROSS-REFERENCE TO RELATED APPLICATION

This application claims the benefit of Korean Patent Application No. 2013-0065587, filed on Jun. 10, 2013 in the Korean Intellectual Property Office, the disclosure of which is incorporated herein by reference.

BACKGROUND

1. Field

Embodiments of the present invention relate to a variable pedal feeling adjustment device, and more particularly to, a variable pedal feeling adjustment device capable of adjusting pedal feeling by increasing and decreasing a moving distance of a reaction piston of a pedal simulator.

2. Description of the Related Art

In general, an active hydraulic boost (AHB) is a brake system that generates braking force when a driver pushes a pedal by sensing the push through an electronic control unit and supplying hydraulic pressure to a master cylinder through operation of a hydraulic pressure generation unit, thereby transferring hydraulic brake pressure to a wheel cylinder of each wheel. In the case of such an AHB, when a driver pushes the brake pedal during normal braking, a pedal displacement sensor senses displacement of the brake pedal. The electronic control unit operates the hydraulic pressure generation unit and controls supply of hydraulic oil stored in a hydraulic oil reservoir to a boost chamber of the master cylinder to produce pressure in the master cylinder. The pressure produced in the master cylinder presses a piston in the master cylinder to produce hydraulic brake pressure. This hydraulic brake pressure is transferred to the wheel cylinder to produce braking force.

In the case in which pressure in the master cylinder changes during regenerative braking, the resulting force may be directly transferred to the brake pedal, thereby adversely affecting pedal feeling. If the pedal feeling is degraded in this way, a large difference occurs between pedal feeling that a driver receives in braking and an actual level of pressure applied to a brake disc of a brake pad in the wheel cylinder, resulting in excessive or insufficient braking. Thereby, disposable components such as a brake pad may need to be frequently replaced and sudden braking or failure of braking leading to a traffic accident may occur.

Figure 1:
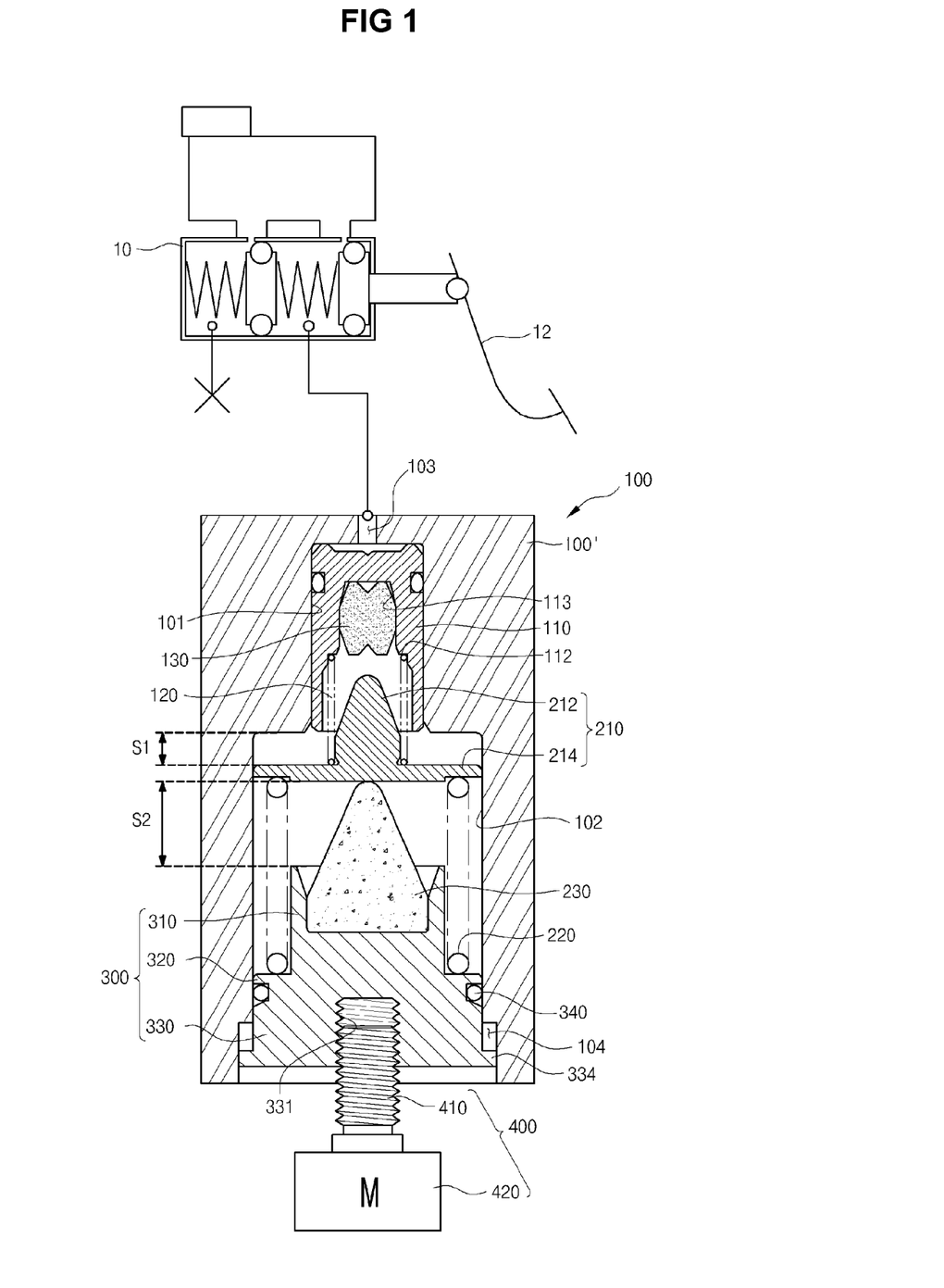
FIG. 1 is a view illustrating a variable pedal feeling adjustment device according to an exemplary embodiment of the present invention.

In conventional cases, a pedal simulator is adopted for the AHB to provide reaction force to the brake pedal. Such a pedal simulator uses, as disclosed in Korean Patent No. 10-0657576, two springs provided therein as shock absorbing members to absorb shock to a simulator piston. However, the two springs merely produce brake pedal feeling linearly varying along the straight lines as shown in FIG. 1, and may not provide required pedal feeling.

Further, because the springs have the limited performance in providing reaction force, the conventional pedal simulator may not adjust pedal feeling that a driver receives.

CITATION LIST

Patent Literature

Korean Patent Registration No. 10-0657576 (Registration Date: Dec. 7, 2006)

SUMMARY

It is an aspect of the present invention to provide a variable pedal feeling adjustment device capable of providing required pedal feeling by selectively changing a pedal stroke distance of a pedal simulator configured to provide pedal feeling.

It is another aspect of the present invention to provide a variable pedal feeling adjustment device capable of improving pedal feeling by preventing sudden increase in pedal effort and providing soft pedal feeling through sequential supply of reaction force using two springs and two damping members.

Additional aspects of the invention will be set forth in part in the description which follows and, in part, will be obvious from the description, or may be learned by practice of the invention.

In accordance with one aspect of the present invention, a variable pedal feeling adjustment device to adjust a stroke distance of a reaction piston provided in a pedal simulator configured to provide pedal feeling for a driver comprises: a pedal simulator including a simulator block formed with an oil hole at an upper portion thereof and a bore therein, the oil hole being connected to a master cylinder to receive hydraulic pressure caused by pedal effort of a driver and the bore communicating with the oil hole, a first reaction unit and a second reaction unit arranged in series in the bore and configured to be pressurized sequentially by pedal effort, and a damping housing configured to support the second reaction unit and installed to a lower portion of the bore while being restricted in rotation; and an actuator including a spindle screw-coupled to the damping housing and a motor connected to the spindle to supply rotational force to the spindle. The damping housing is moved linearly and changed in position by forward and backward rotation of the spindle.

The first reaction unit may include a first reaction piston and the second reaction unit may include a second reaction piston. The first reaction piston of the first reaction unit may provide pedal feeling by moving a first stroke distance and may contact the second reaction piston of the second reaction unit, and the second reaction piston of the second reaction unit pressurized by the first reaction piston may provide pedal feeling by moving a second stroke distance. The second reaction unit may be changed in position according to a change of position of the damping housing while the second stroke distance is kept unchanged, and the first stroke distance of the first reaction unit may be adjusted thereby.

A moving distance of the damping housing may be adjusted by control of the motor and a pitch of threads formed at an outer peripheral surface of the spindle.

The damping housing may include: a support portion which is formed in a cylindrical shape having an opened top surface and spaced a certain distance apart from the second reaction piston; a flange portion which extends radially from an outer peripheral surface of the support portion; and a body portion which is formed below the support portion and has an engagement hole at a lower center portion thereof for screw-engagement with the spindle and a rotation-prevention mechanism to convert rotating movement of the spindle into linear movement.

The rotation-prevention mechanism may include protrusions which protrude radially from an outer peripheral surface of the body portion and are spaced a certain interval apart from each other, and grooves which are formed at positions of the bore corresponding to the protrusions while extending in a longitudinal direction of the bore and have a shape matching the protrusions.

The damping housing may be provided with a sealing member around an outer peripheral surface thereof to seal a lower portion of the bore.

The first reaction unit may include: a first reaction piston slidably installed in the bore; a first damping member installed to the first reaction piston to move together therewith; and a first reaction spring configured to be compressed by the first reaction piston.

The first reaction piston may have an insertion recess which is concavely formed at a lower end portion of the first reaction piston and extends upward and into which the first damping member is inserted. The insertion recess may be provided with a stepped portion by which an upper end of the first reaction spring is supported.

The second reaction unit may include: a second reaction piston slidably provided in the bore and spaced a certain distance apart from the first reaction piston to support the first reaction spring; a second reaction spring installed between the second reaction piston and the damping housing and configured to be compressed by the second reaction piston; and a second damping member installed in the damping housing and configured to be elastically deformed by being pressurized by the second reaction piston.

The second reaction piston may include: a protruding portion protruding toward the first damping member and spaced a certain distance apart from the first damping member; and an extending portion extending radially outward from a lower end of the protruding portion. The protruding portion may be inserted into the first reaction spring and a lower end of the first reaction spring may be supported by the extending portion.

The first reaction spring may have a smaller modulus of elasticity than the second reaction spring so that when the damping housing moves upward by the spindle, the second reaction piston moves together by elastic force of the second reaction spring and compresses the first reaction spring.

The first damping member and the second damping member may be made of rubber which is elastically deformable.

As is apparent from the above description, the variable pedal feeling adjustment device provides required pedal feeling by selectively changing a stroke distance of the first reaction unit through a change of the position of the second reaction unit whose stroke distance is kept unchanged.

Further, since reaction force is sequentially supplied using two springs and two damping members, sudden increase in pedal effort is prevented and soft pedal feeling is provided, thereby improving pedal feeling.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Now, preferred embodiments of the present invention will be described in detail with reference to the annexed drawings.

FIG. 1 is a view illustrating a variable pedal feeling adjustment device according to an exemplary embodiment of the present invention.

As shown in FIG. 1, a variable pedal feeling adjustment device according to an exemplary embodiment of the present invention comprises a pedal simulator 100 to provide pedal feeling for a driver and an actuator 400 to supply driving force to change a stroke distance of a reaction piston of the pedal simulator 100.

The pedal simulator 100 includes a simulator block 100' installed to a master cylinder 10, which is configured to produce hydraulic brake pressure by a brake pedal 12, to accommodate oil from the master cylinder 10 therein, a first reaction unit and a second reaction unit installed to the simulator block 100' to provide pedal feeling, and a damping housing 300 configured to support the second reaction unit and perform sliding movement. The first reaction unit and the second reaction unit are provided in a bore formed in the simulator block 100' and arranged in series.

The simulator block 100' is formed with an oil hole 103 at an upper portion thereof to allow inflow of hydraulic pressure from the master cylinder 10 and a bore communicating with the oil hole 103. The bore formed in the simulator block 100' includes a first bore 101 in which the first reaction unit is disposed, and a second bore 102 in which the second reaction unit is disposed. Referring to FIG. 1, the first bore 101 has a smaller diameter than the second bore 102. Thereby, the bore has a stepped shape.

The damping housing 300 is configured to seal a lower end portion of the bore and is restricted in rotation. The damping housing 300 is installed to a lower end portion of the second bore 102 and is provided with a sealing member 340 around an outer peripheral surface thereof, thereby sealing the inside of the bore by contact between the second bore 102 and the sealing member 340. Herein, the damping housing 300 functions to support the second reaction unit and also to change a position of the second reaction unit through sliding movement while being restricted in rotation, which will be explained in detail later.

The first reaction unit includes a first reaction piston 110 slidably installed in the first bore 101, a first damping member 130 installed to move together with the first reaction piston 110, and a first reaction spring 120 configured to be compressed by the first reaction piston 110.

When hydraulic pressure is introduced through the oil hole 103 located above the first reaction piston 110, the first reaction piston 110 moves downward. Herein, an insertion recess 113 is concavely formed at a lower end portion of the first reaction piston 110 and extends upward. The insertion recess 113 is provided with a stepped portion 112, a diameter of which is decreased from the lower end portion to the upper end portion of the first reaction piston 110. The first damping member 130 is inserted into the insertion recess 113 and is located above the stepped portion 112, and the upper end of the first reaction spring 120 is supported by the stepped portion 112. Therefore, the first damping member 130 moves together with the first reaction piston 110, and the first reaction spring 120 provides reaction force during movement of the first reaction piston 110.

The first reaction spring 120 is formed in a coil shape to supply reaction force to the brake pedal 12. Herein, the lower end of the first reaction spring 120 is supported by a second reaction piston 210 which will be described later.

The first damping member 130 is made of rubber which is elastically deformable. The first damping member 130 functions to supply reaction force to the brake pedal 12 when contacted and pressurized by the second reaction piston 210.

The second reaction unit includes a second reaction piston 210 provided in the second bore 102 to slide, a second reaction spring 220 installed between the second reaction piston 210 and the damping housing 300 to be compressed by the second reaction piston 210, and a second damping member 230 installed in the damping housing 300 to be supported thereby.

The second reaction piston 210 is spaced a certain distance apart from the first reaction piston 110 to support the lower end of the first reaction spring 120. More specifically, the second reaction piston 210 includes a protruding portion 212 provided at a position opposite to the insertion recess 113 and protruding toward the first damping member 130, and an extending portion 214 extending radially outward from a lower end of the protruding portion 212.

As shown in the drawings, the protruding portion 212 protrudes toward the first bore 101. Thereby, the protruding portion 212 is positioned in the first reaction piston 110 and spaced a certain distance apart from the first damping member 130. Herein, the protruding portion 212 is arranged to be inserted into the first reaction spring 120 to allow the lower end of the first reaction spring 120 to be supported by the extending portion 214.

The extending portion 214 is disposed in the second bore 102 and functions to support the lower end of the first reaction spring 120 and the upper end of the second reaction spring 220. Herein, the extending portion 214 is configured to pressurize the second damping member 230 positioned therebelow. Accordingly, a bottom surface of the extending portion 214 may have a flat shape. Further, the extending portion 214 has a diameter corresponding to a diameter of the second bore 102 to be guided by the second bore 102 during sliding movement.

The second reaction spring 220 is formed in a coil shape to supply reaction force to the brake pedal 12. That is, when the second reaction piston 210 moves, the second reaction spring 220 is compressed to supply reaction force. Herein, the modulus of elasticity of the second reaction spring 220 is greater than that of the first reaction spring 120. Thereby, the second reaction piston 210 is pushed after the first reaction piston 110 is pushed.

The second damping member 230 is made of rubber which is elastically deformable. The second damping member 230 functions to supply reaction force to the brake pedal 12 when contacted and pressurized by the second reaction piston 210. The second damping member 230 is installed in the damping housing 300. Although it is illustrated that the upper end of the second damping member 230 installed in the damping housing 300 is in contact with the second reaction piston 210, the embodiments are not limited thereto. It may be constituted that the second reaction piston 210 comes into contact with the second damping member 230 after moving a certain distance down.

The pedal simulator 100 includes the two reaction spring 120 and 220 and the two damping members 130 and 230 and functions to provide pedal feeling sequentially by the first reaction unit and the second reaction unit. In other words, the first reaction piston 110 of the first reaction unit compresses the first reaction spring 120 and moves a first stroke distance S1 until contacting the second reaction piston 210 of the second reaction unit to provide a driver with reaction force (pedal feeling), and the second reaction piston 210 pressurized by the first reaction piston 110 pressurizes the second reaction spring 220 and the second damping member 230 and moves a second stroke distance S2 until contacting the upper end of the damping housing 300 to provide a driver with reaction force.

Figure 2:
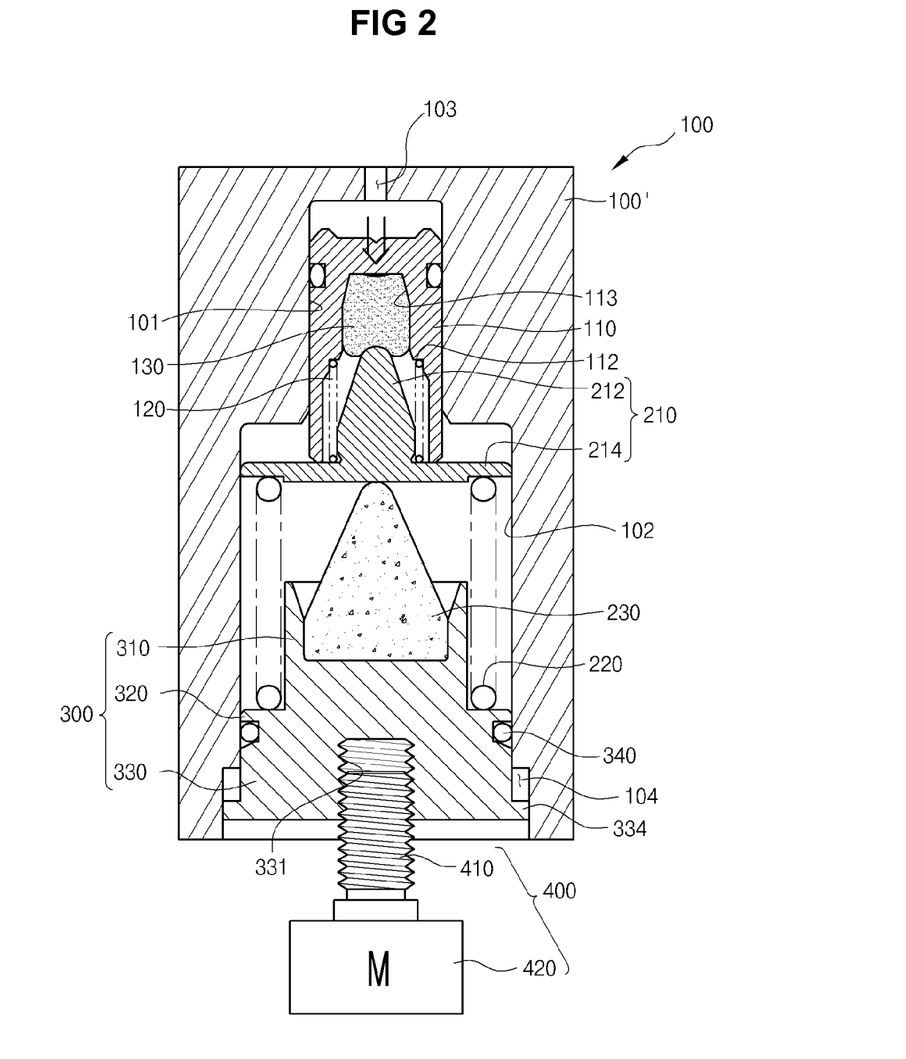
FIGS. 2 and 3 are views illustrating operation of a pedal simulator of the variable pedal feeling adjustment device according to an exemplary embodiment of the present invention.

More specifically, as shown in FIG. 2, when hydraulic pressure from the master cylinder (see '10' in FIG. 1) is introduced through the oil hole 103 of the simulator block 100', the first reaction piston 110 is pushed to compress the first reaction spring 120. Thereby, reaction force is produced. In addition, the first damping member 130 installed at the first reaction piston 110 is also moved and pressurized by the second reaction piston 210 to produce reaction force.

Figure 3:
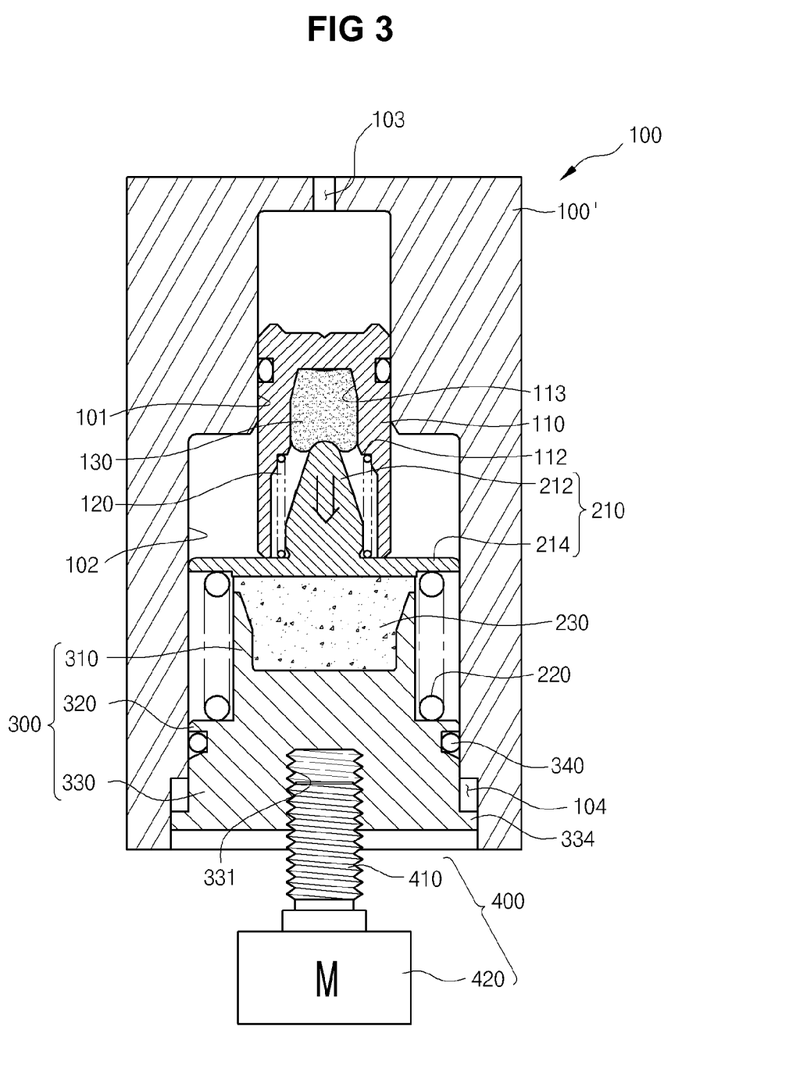

Subsequently, as shown in FIG. 3, as the first reaction piston 110 is moved and the lower end thereof contacts the second reaction piston 210, the second reaction piston 210 is pushed and the second reaction spring 220 is compressed to produce reaction force. At this time, as the second reaction piston 210 contacts and pressurizes the second damping member 230 positioned therebelow, the second damping member 230 is pressurized to produce reaction force. In other words, the reaction force transferred to a driver by the second reaction unit moving the second stroke distance (see 'S2' in FIG. 1) corresponds to a combination of the reaction force of the first reaction unit and the reaction force of the second reaction unit. Since reaction force is combined sequentially and transferred to a driver in a quadratic curve shape, which is similar to reaction force produced by a pedal simulator of a conventional brake system (CBS), thereby providing a driver with good pedal feeling (refer to FIG. 6).

The damping housing 300 is assembled to the lower end portion of the second bore 102 and is spaced a certain distance apart from the second reaction piston 210. More specifically, the damping housing 300 includes a support portion 310 which is formed in a cylindrical shape having an opened top surface, a flange portion 320 which extends radially from an outer peripheral surface of the support portion 310, and a body portion 330 which is formed below the support portion 310 and connected to an actuator 400. As described above, the damping housing 300 is installed to the lower end portion of the second bore 102 to seal the bore. The damping housing 300 is allowed to slide, however, it is restricted in rotation.

The support portion 310 has an opened top surface to form an accommodation space therein, and the second damping member 230 is installed in the accommodation space through the opened top surface. Herein, an upper inner surface of the support portion 310 may extend upward while being inclined outward so that the second damping member 230 is easily elastic-deformed.

The flange portion 320 extends radially from the support portion 310, and the top surface of the flange portion 320 supports the lower end of the second reaction spring 220.

The body portion 330 is formed below the support portion 310, and is provided with the sealing member 340 around the outer peripheral surface thereof to seal the second bore 102. The body portion 330 is formed with an engagement hole 331 at a lower center portion thereof, which is configured with threads for screw-engagement with a spindle 410 of the actuator 400 which will be described later. The body portion 330 is further provided with a rotation-prevention mechanism to move linearly by receiving rotational force from the actuator 400.

The rotation-prevention mechanism includes protrusions 334 which protrude radially from an outer peripheral surface of the body portion 330 and are spaced a certain interval apart from each other, and grooves 104 which are formed at positions of the second bore 102 corresponding to the protrusions 334 and have a shape matching the protrusions 334. The grooves 104 extend in a longitudinal direction of the second bore 102. The protrusions 334 of the body portion 330 is engaged with the grooves 104 to be restricted in rotation and accordingly, the body portion 330 moves linearly by forward and backward rotation of the spindle 410. Upper ends of the grooves 104 function as a stopper to limit a moving distance of the body portion 330.

The support portion 310, the flange portion 320 and the body portion 330 may be formed integrally with each other.

The actuator 400 includes a spindle 410 which is screw-coupled to the damping housing 300, and a motor 420 which is connected to the spindle 410 to supply rotational force to the spindle 410. The actuator 400 is disposed below the damping housing 300 and functions to transfer rotational force generated by forward and backward rotation of the motor 420 to the damping housing 300.

A moving distance of the damping housing 300 is determined by control of the motor 420 and a pitch of threads formed at an outer peripheral surface of the spindle 410. Thereby, a moving distance of the damping housing 300 is precisely controlled.

Hereinafter, changes of the stroke distances S1 and S2 of the first and second reaction units according to a change of the position of the damping housing 300 caused by sliding movement by the actuator 400 will be explained.

Figure 4:
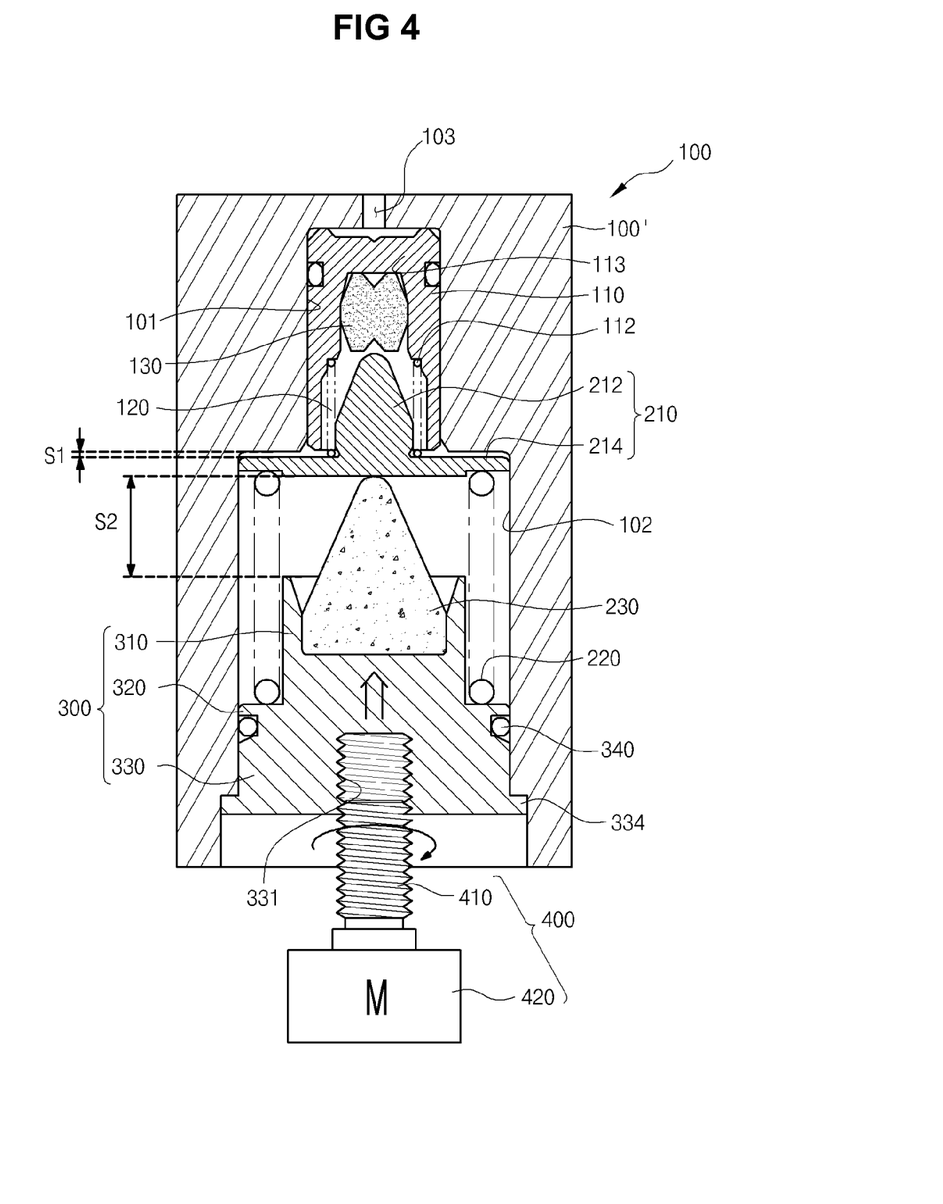
FIGS. 4 and 5 are views illustrating operation of the variable pedal feeling adjustment device according to an exemplary embodiment of the present invention.

First, as shown in FIG. 4, when the damping housing 300 coupled to the spindle 410 moves upward according to forward (clockwise) rotation of the motor 420, the second reaction unit supported by the damping housing 300 moves upward together and thus, an initial installation position is changed. At this time, the second stroke distance S2 of the second reaction unit is kept unchanged, however, the first stroke distance S1 of the first reaction unit is shortened by a moving distance of the damping housing 300, i.e., a moving distance of the second reaction unit. This is because the second reaction unit moves upward while compressing the first reaction spring 120 which has smaller elastic force than the second reaction spring 220. As the first stroke distance S1 of the first reaction unit is shortened, pedal effort that a driver receives is changed. In other words, since pedal effort is increased as the first stroke distance S1 is shortened, a driver receives "hard" pedal feeling.

Figure 5:
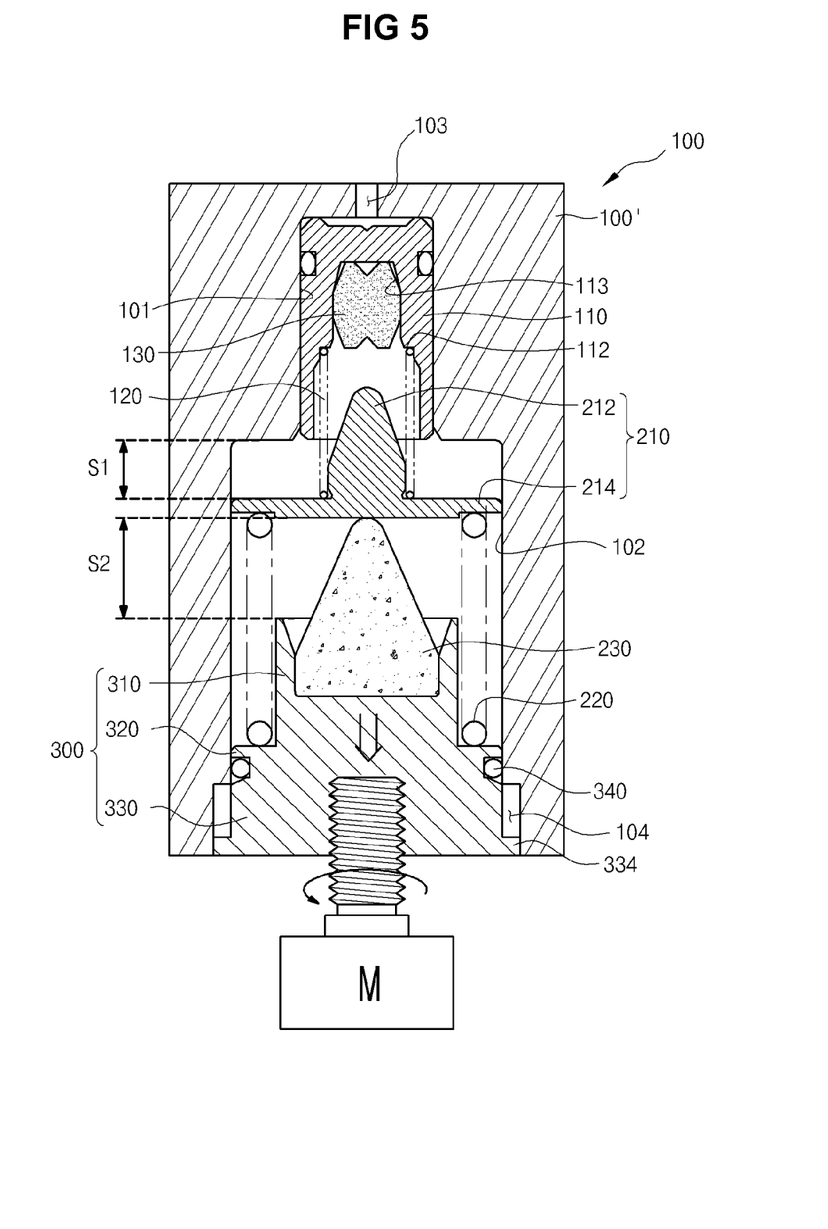

Next, as shown in FIG. 5, when the damping housing 300 coupled to the spindle 410 moves downward according to backward (counterclockwise) rotation of the motor 420, the second reaction unit supported by the damping housing 300 moves downward together and thus, an initial installation position is changed. At this time, the second stroke distance S2 of the second reaction unit is kept unchanged. Thereby, the first reaction spring 120 is expanded and the first stroke distance S1 of the first reaction unit is elongated by a downward-moving distance of the second reaction unit. In other words, since pedal effort is decreased as the first stroke distance S1 is elongated, a driver receives "soft" pedal feeling.

Figure 6:
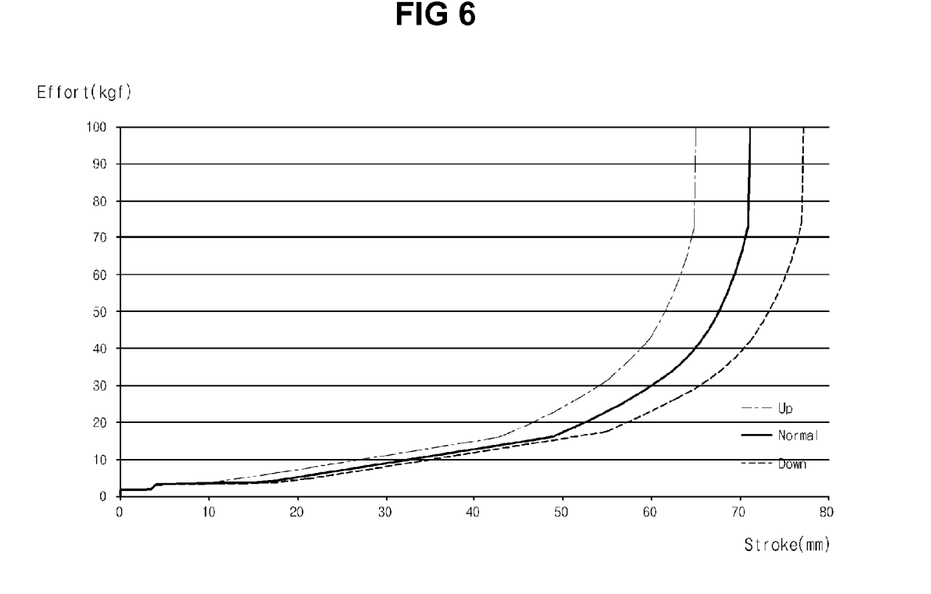
FIG. 6 is a graph illustrating a relationship between a pedal stroke by the variable pedal feeling adjustment device and pedal feeling according to an exemplary embodiment of the present invention.

Such changes of the first stroke distance S1 and pedal feeling according to a change of installation position of the second reaction unit are illustrated in FIG. 6. As shown in the drawing, it is understood that pedal feeling that a driver receives is changed according to a change of the first stroke distance S1. In other words, since pedal feeling can be variably adjusted according to driver's demands, improved pedal feeling is provided for a driver.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A variable pedal feeling adjustment device to adjust a stroke distance of a reaction piston provided in a pedal simulator configured to provide pedal feeling for a driver, comprising:
   the pedal simulator including a simulator block formed with an oil hole at an upper portion thereof and a bore therein, the oil hole being connected to a master cylinder to receive hydraulic pressure caused by pedal effort of a driver and the bore communicating with the oil hole, a first reaction unit and a second reaction unit arranged in series in the bore and configured to be pressurized sequentially by pedal effort, and a damping housing configured to support the second reaction unit and installed to a lower portion of the bore while being restricted in rotation; and
   an actuator including a spindle screw-coupled to the damping housing and a motor connected to the spindle to supply rotational force to the spindle independently of the hydraulic pressure caused by pedal effort of the driver,
   wherein the damping housing is moved linearly and changed in position by forward and backward rotation of the spindle.

2. The variable pedal feeling adjustment device according to claim 1, wherein the first reaction unit includes a first reaction piston and the second reaction unit includes a second reaction piston,
   and wherein the first reaction piston of the first reaction unit provides pedal feeling by moving a first stroke distance and contacts the second reaction piston of the second reaction unit, and the second reaction piston of the second reaction unit pressurized by the first reaction piston provides pedal feeling by moving a second stroke distance,
   and wherein the second reaction unit is changed in position according to a change of position of the damping housing while the second stroke distance is kept unchanged, and the first stroke distance of the first reaction unit is adjusted thereby.

3. The variable pedal feeling adjustment device according to claim 1, wherein a moving distance of the damping housing is adjusted by control of the motor and a pitch of threads formed at an outer peripheral surface of the spindle.

4. The variable pedal feeling adjustment device according to claim 2, wherein the damping housing includes:
   a support portion which is formed in a cylindrical shape having an opened top surface and spaced a certain distance apart from the second reaction piston;
   a flange portion which extends radially from an outer peripheral surface of the support portion; and
   a body portion which is formed below the support portion and has an engagement hole at a lower center portion thereof for screw-engagement with the spindle and a rotation-prevention mechanism to convert rotating movement of the spindle into linear movement.

5. The variable pedal feeling adjustment device according to claim 4, wherein the rotation-prevention mechanism includes protrusions which protrude radially from an outer peripheral surface of the body portion and are spaced a certain interval apart from each other, and grooves which are formed at positions of the bore corresponding to the protrusions while extending in a longitudinal direction of the bore and have a shape matching the protrusions.

6. The variable pedal feeling adjustment device according to claim 4, wherein the damping housing is provided with a sealing member around an outer peripheral surface thereof to seal a lower portion of the bore.

7. The variable pedal feeling adjustment device according to claim 1, wherein the first reaction unit includes:
   a first reaction piston slidably installed in the bore;
   a first damping member installed to the first reaction piston to move together therewith; and
   a first reaction spring configured to be compressed by the first reaction piston.

8. The variable pedal feeling adjustment device according to claim 7, wherein the first reaction piston has an insertion recess which is concavely formed at a lower end portion of the first reaction piston and extends upward and into which the first damping member is inserted,
   and wherein the insertion recess is provided with a stepped portion by which an upper end of the first reaction spring is supported.

9. The variable pedal feeling adjustment device according to claim 7, wherein the second reaction unit includes:
   a second reaction piston slidably provided in the bore and spaced a certain distance apart from the first reaction piston to support the first reaction spring;
   a second reaction spring installed between the second reaction piston and the damping housing and configured to be compressed by the second reaction piston; and
   a second damping member installed in the damping housing and configured to be elastically deformed by being pressurized by the second reaction piston.

10. The variable pedal feeling adjustment device according to claim 9, wherein the second reaction piston includes:
    a protruding portion protruding toward the first damping member and spaced a certain distance apart from the first damping member; and
    an extending portion extending radially outward from a lower end of the protruding portion,
    and wherein the protruding portion is inserted into the first reaction spring and a lower end of the first reaction spring is supported by the extending portion.

11. The variable pedal feeling adjustment device according to claim 9, wherein the first reaction spring has a smaller modulus of elasticity than the second reaction spring so that when the damping housing moves upward by the spindle, the second reaction piston moves together by elastic force of the second reaction spring and compresses the first reaction spring.

12. The variable pedal feeling adjustment device according to claim 9, wherein the first damping member and the second damping member are made of rubber which is elastically deformable.

\* \* \* \* \*